March 13, 1956  H. B. TAYLOR ET AL  2,737,980
POPPET VALVE
Filed July 20, 1953

INVENTORS
HUGH B. TAYLOR
HARRY I. ARNOLD
BY
THEIR ATTORNEY

United States Patent Office 2,737,980
Patented Mar. 13, 1956

2,737,980

POPPET VALVE

Hugh B. Taylor, Waverly, N. Y., and Harry I. Arnold, Athens, Pa., assignors to Ingersoll-Rand Company, New York, N. Y., a corporation of New Jersey Application July 20, 1953, Serial No. 369,152

4 Claims. (Cl. 137—630)

This invention relates to valves, and more particularly to valves of the poppet type for use in controlling the flow of fluid under pressure.

In valves of this type the valve once seated is commonly held firmly in the closed position by the pressure of the fluid the flow of which is controlled by the valve. Accordingly, if the pressure of such fluid is relatively high considerable force is required to unseat the valve. This is a distinct disadvantage in some instances as for example where the valve is unseated by a force applied by the operator either on the valve stem directly or through a lever in that once the valve is open the force applied by the operator is suddenly unopposed—i. e., the fluid force tending to hold the valve closed suddenly drops to substantially zero, resulting in jerky operation of the valve.

It is accordingly one object of this invention to provide a poppet valve for controlling the flow of pressure fluid in which the fluid force resisting opening of the valve is gradually balanced by an oppositely directed fluid force as the valve moves from the closed position to the full open position.

A further object of this invention is to provide a poppet valve of such type which is simple in construction and relatively inexpensive.

Figure 1:
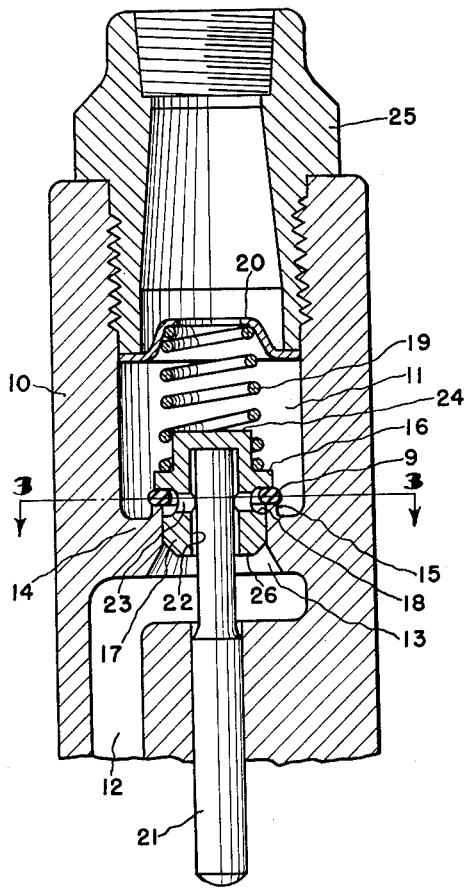
Figure 2:
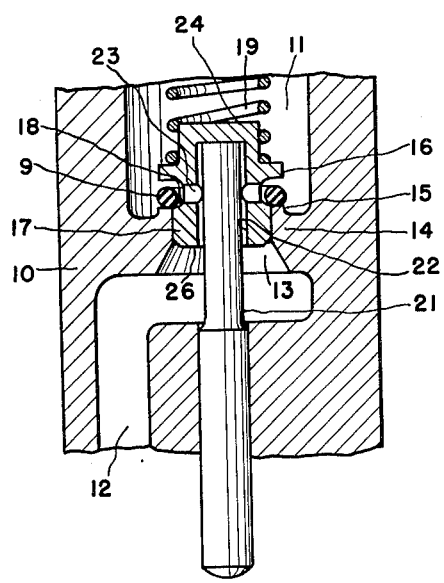
Figure 3:
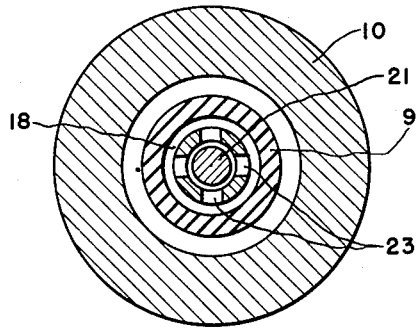

Further objects will become apparent from the following description and drawings in which:

Figure 1 is a longitudinal sectional elevation of a poppet valve constructed in accordance with the practice of the invention and shown in the closed position, Fig. 2 is a longitudinal elevation showing the valve in a slightly open position, and Fig. 3 is a transverse view taken through Figure 1 along the line 3—3 looking in the direction of the arrows.

Referring to the drawings, a preferred embodiment of the valve is shown comprising a cylindrical body or valve housing 10 defining a pressure fluid inlet passage 11 and outlet passage 12 communicated through an opening 13 in a transverse partition 14. A boss 15 encircling the opening 13 serves as a seat for a flange 16 on a valve head 17 slidably mounted within the opening 13. The annular flange 16 is in face relation with and overlies the boss 15 so that when the head 17 moves into its lower limiting position the boss 15 and flange 16 cooperate to provide an effective seal against the passage of pressure fluid through the opening 13.

In order to provide a more effective seal at this juncture without carefully machining the face surfaces of the boss 15 and flange 16 and to prevent wearing of such surfaces, an O-ring 9, or similar sealing element, may be interposed between the flange 16 and boss 15 and located in a peripheral groove 18 adjacent the flange 16.

The valve head 17 is constantly urged toward its closed position by means such as a spring 19 biased between the upstream end 24 of the flange 16 and a spring retainer 20 positioned in the passage 11 by a member 25 threaded in the inlet passage 11. The head 17 is moved into its open position against the combined forces of the spring 19 and the pressure of fluid acting against the upstream end surface of the head 17 by means of a member 21 engaging the head 17. The member 21 is here shown in the form of a valve stem rod 21 loosely inserted in a recess 22 formed in the downstream end 26 of the valve head 17. The other end of the rod 21 extends through the wall of the body 10 so that it may be actuated directly or through suitable linkage (not shown).

In furtherance of one object of this invention, openings 23 are provided in the head 17, which openings lead from a point adjacent the downstream end surface of the flange 16 to the recess 22. Thus, the openings 23 and recess 22 serve as a restricted passageway leading from the point of sealing contact between the valve head 17 and boss 15 to the downstream end 26 of the valve head 17. When the rod 21 is actuated to move the valve head 17 from its closed position pressure fluid is bled through the openings 23 and recess 22 to the downstream end of the valve as soon as the seal is broken between the valve head 17 and boss 15 (see Fig. 2). This bleeding process continues throughout the entire opening operation of the valve so that the pressure of fluid acting on the downstream end of the valve is gradually increased throughout this period thereby reducing proportionately the force required to open the valve. This results in smooth opening operation of the valve.

In furtherance to this end, the circumferential groove 18 is formed with a substantially greater diameter than the diameter of the sealing element 9. This insures leakage of pressure fluid through the opening 23 as soon as the valve 17 is moved a sufficient distance in the opening direction to release the sealing force applied to the member 9 (see Fig. 2).

We claim:

1. A pressure fluid valve comprising, a body having an inlet and an outlet, an opening in said body communicated with said inlet and outlet for passage of pressure fluid therebetween, a valve head slidably mounted in said opening and having a flange overlying said opening, said valve head having a body portion with a sliding fit in said opening to prevent flow therethrough during at least the first portion of the opening stroke of the valve, a sealing element positioned between said flange and body adapted to form a fluid tight seal therebetween whenever the valve head is in the closed position, a member engaging said valve head and adapted to move the head into the open position to permit flow of such fluid through said opening, means for urging the valve head into the closed position, and a passageway leading from a point adjacent said sealing element to the outlet for the flow of pressure fluid whenever the seal by the sealing element is broken, said passageway being of sufficient flow area and the length of said body portion being such that the fluid pressures in the inlet and outlet are gradually and substantially equalized during the opening stroke of the valve and prior to said body portion moving to a position to permit flow through said opening.

2. A pressure fluid valve comprising, a body having an inlet and an outlet, an opening in said body communicated with said inlet and outlet for passage of pressure fluid therebetween, a valve head slidably mounted in said opening and having a flange overlying said opening, said valve head having a body portion with a sliding fit in said opening to prevent flow therethrough during at least the first portion of the opening stroke of the valve, a sealing element positioned between said flange and body adapted to form a fluid tight seal therebetween whenever the valve head is in the closed position, said valve head having a recess in the downstream end thereof, a member having a loose fit in said recess and adapted to move the head into the open position to permit flow of fluid through said opening, means for urging the valve head into the closed position, and an opening in said valve head leading from a point adjacent said sealing element to said recess for the flow of pressure fluid whenever the valve head is actuated by said member, said passageway being of sufficient flow area and the length of said body portion being such that the fluid pressures in the inlet and outlet are gradually and substantially equalized during the opening stroke of the valve and prior to said body portion moving to a position to permit flow through said opening.

3. A pressure fluid valve comprising, a body having an inlet and an outlet, an opening in said body communicated with said inlet and outlet for passage of pressure fluid therebetween, a valve head slidably mounted in said opening and having a flange therearound and a peripheral groove therein adjacent said flange, said valve head having a body portion positioned downstream of said flange with a sliding fit in said opening to prevent flow therethrough during at least the first portion of the opening stroke of the valve, a sealing element fitted loosely in said groove and positioned between said flange and body adapted to form a fluid tight seal therebetween whenever the valve head is in the closed position to prevent the flow of pressure fluid through said opening, said valve head having a recess in the downstream end thereof, a member having a loose fit in said recess and adapted to move the head into the open position to permit flow of fluid through said opening, means for urging the valve head into the closed position, and an opening in said valve head leading from said groove to said recess for the flow of pressure fluid whenever the valve head is actuated by said member, said passageway being of sufficient flow area and the length of said body portion being such that the fluid pressures in the inlet and outlet are gradually and substantially equalized during the opening stroke of the valve and prior to said body portion moving to a position to permit flow through said opening.

4. A pressure fluid valve comprising, a body having an inlet and an outlet, an opening in said body communicated with said inlet and outlet for passage of pressure fluid therebetween, a valve head having a seating surface overlying said opening, a sealing element positioned between said surface and the body and adapted to form a fluid tight seal therebetween only when the valve head is in the full closed position to prevent the flow of pressure fluid through said opening, said valve head also having a body portion with a slidable sealing fit with the surface of said opening to prevent flow therealong during at least the first portion of the opening stroke of the valve and after said seal is broken by movement of the valve head from the full closed position, a member adapted to said valve head for moving the head into the full open position to permit flow of pressure fluid through said opening, means for urging the head into the closed position, and a passageway in said head leading from the outlet to a point adjacent the inlet side of said opening, the inlet end of said passageway terminating at said seating surface such that flow through said passageway is closed off by said sealing element when the valve is in the closed position and flow is permitted during the first portion of the opening stroke of the valve head and prior to said body portion moving to a position to permit flow through said opening.

References Cited in the file of this patent

UNITED STATES PATENTS

| | | |
|---|---|---|
| 312,077 | Bowen | Feb. 10, 1885 |
| 1,146,247 | Grisenthwaite | July 13, 1915 |
| 1,917,936 | Hartman | July 11, 1933 |
| 1,998,913 | Wheaton | Apr. 23, 1935 |
| 2,001,487 | Doherty | May 14, 1935 |
| 2,201,752 | Winberg | May 21, 1940 |
| 2,311,292 | Eilers | Feb. 16, 1943 |
| 2,362,608 | Allen | Nov. 14, 1944 |
| 2,462,646 | Koehler | Feb. 22, 1949 |
| 1,807,970 | Davis | June 2, 1951 |

FOREIGN PATENTS

| | | |
|---|---|---|
| 662,448 | Great Britain | of 1951 |